Jan. 23, 1945.  B. SANDOR  2,368,070
PYROPHORIC LIGHTER
Filed Oct. 7, 1942
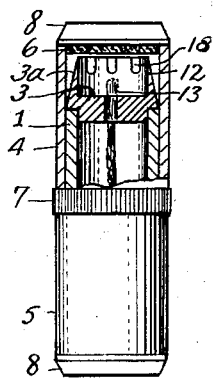
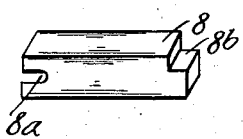
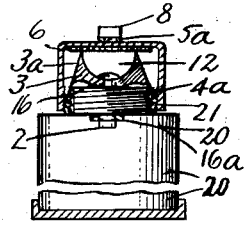
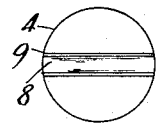
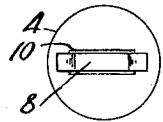
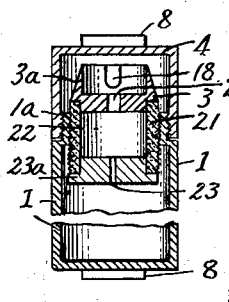
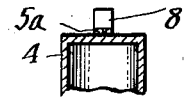
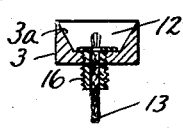
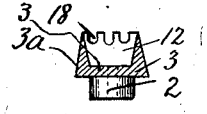
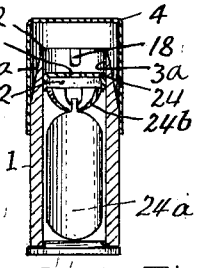
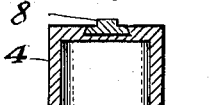
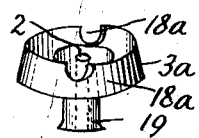
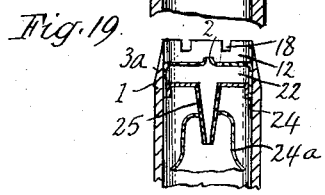
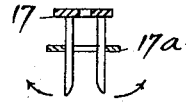
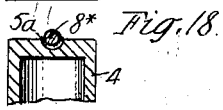
Inventor
Béla Sándor,
By Chatum & Company
Attys Patented Jan. 23, 1945

2,368,070

UNITED STATES PATENT OFFICE 2,368,070

PYROPHORIC LIGHTER

Béla Sándor, New Barnet, England

Application October 7, 1942, Serial No. 461,207
In Great Britain September 29, 1941

2 Claims. (Cl. 67—7.1)

This invention relates to pyrophoric lighters for smokers and others, its object being to provide a new construction suitable for mass production, of the kind having no rotary wheel and in which the flint is carried on the cap of the lighter.

Various constructional embodiments are shown in the accompanying drawing but the general contour may vary to suit individual tastes.

Figure 1 is a vertical section of one form of construction; Fig. 2 is a plan of a flint-carrying cap; Fig. 3 is a modification of Fig. 2; Fig. 4 is a vertical sectional view at right angles to Figure 1 of another form of flint attachment; Figs. 5 and 6 show still other forms of flint attachment in cross section; Fig. 7 is a perspective view of another flint; Figs. 8 and 9 are part sectional elevations of suitable striking steels while Figs. 10 and 11 are vertical sections of other cup-shaped steels; Fig. 12 is a perspective view of another form of steel; Fig. 13 is an elevation of a screw-threaded tubular stud; Fig. 14 is a part vertical section of a tubular rivet and washer; Fig. 15 is a fragmentary sectional elevation of another lighter, whilst Figs. 16 and 17 show vertical sections of still other forms of construction; Fig. 18 shows a round section flint cemented into a groove in the cap, and Fig. 19 shows a sectional elevation of a modification of Fig. 17.

The lighter comprises a body portion 1 with a chamber for containing fuel spirit and having at one end a peripherally slotted cup-shaped striking steel 3 with acute peripheral knife edge provided with a substantially central wick passage 2. The steel is enclosed by a flint-carrying cap 4 whilst the other end of the body is closed either by a screw cap, a plug or another cap 5 which may be identical and exchangeable with cap 4 and likewise have a flint 8 as shown in Fig. 1. The cap or caps may slide or screw on or have a bayonet slot connection with the body.

Fibre or other washers 6 can be used to avoid leakage.

Body 1 may have a milling or abutment 7 for the inner edge of the cap or caps, and is preferably made of synthetic resinous or other plastic material.

Each cap 4 or 5 carries a flint 8 secured in any suitable manner. In Fig. 4 the flint is cemented to the cap by a suitable adhesive solution indicated by 5a. It may be held by a resinous liquid solution or the like which is baked to harden it. An ordinary round flint 8* can similarly be secured in a groove in the cap as in Fig. 18. Or transverse guides 9 as in Fig. 2, or a rectangular or other frame 10 as in Fig. 3, may hold the flint or other frame 10 as in Fig. 3, may hold the flint in position. In Fig. 5 the flint is grooved and held by claws 11 pressed out from the cap or fixed thereto. The shape of the flint may vary. In Fig. 6 it is dovetailed and moulded into the cap. In Fig. 7 it has a groove 8a at one end to engage with a lip pressed out of the cap whilst its other end is rebatted at 8b onto which a claw provided on the cap, can press or of course both ends could be grooved, or rebatted.

To obtain a good spark and ensure prompt ignition of the wick at the first attempt, such spark must be directed towards the wick and for this purpose the steel must be cup-shaped with acute peripheral knife edge.

Suitable forms of steel are illustrated. The steel 3 has an acute peripheral knife edge 3a with cup-shaped centre part 12 into which the wick 13 protrudes. The inside of the cup is shown straight in Figs. 1 and 8 but other forms are shown in Figs. 9, 10, 11, 12, 15 and 16. The steel may be mounted on a cork 14 with fibre or other washers 15 or be screw-threaded as in Fig. 9. The steel shown in Fig. 10 is secured to the spirit container by a screw threaded tubular stud 16 with tightening washer 16a, the wick passing through passage 2. Fig. 13 shows the stud to enlarged scale. Such a steel can be immediately secured to an ordinary tin adapted to contain fuel spirit for domestic purposes. A cheaper form of attachment is shown in Fig. 14 where a tubular split rivet receives a washer 17a and then has the ends of legs 17 bent over in the direction of the arrows.

The steel 3 is made with a peripheral notch, groove, grooves or the like 18 or diametral slots 18a (Fig. 12) the effect of which is that the flame is longer and stronger by reason of the air current drawn thereby through the slots or grooves. When the lighter is held in an approximately horizontal position with one slot at the top and another at the bottom of the cup shaped steel, the flame extends upwardly through the upper slot and the heat of the flame and the air current entering through the slots cause a far larger flame than without the slots. The air draft caused by the flame and the slots facilitates ignition and improves the flame, as hot air naturally rises.

The steel may have a neck 19, advantageously grooved or flared so that it can be moulded into the material of the body 1.

In Fig. 15, 20 is a tin for fuel spirit which is perforated for the passage of the tubular stud 16 or the like securing the steel 3 thereto. The steel forms the seating for and is enclosed by a cap 4a with washer 6 and flint 8 and is preferably screw-threaded as shown.

In Fig. 16 the body 1 has an externally screw-threaded neck 1a for a cap 4 with flint 8. The steel 3 is provided with a tube 21 preferably of plastic material screwed or otherwise secured in the neck 1a. Tube 21 contains absorbent material 22 and may be closed by a closure 23a with one or more fine capillary passages 23. Such a steel with its tube 21 can be used with containers in which fuel spirit is normally sold.

In Fig. 17 body 1 terminates in an acute knife edge steel 3a with diametral slots 18 made integral therewith. The base of the cup being formed by a disc, cup or the like 24 forced or removably inserted within the body and being centrally perforated for the passage of the wick. The disc or cup 24 is formed or provided with gripping means 24b for the end of a cartridge type of fuel container 24a generally found on the market, a wad 22 of absorbent material being advantageously interposed between the cartridge 24a and the disc 24. The gripping means shown are in the form of spring fingers but may consist of a hollow cone-like needle 25 adapted to be inserted in the cartridge to perforate same and to remain fast therein by friction as shown in Fig. 19.

I claim:
1. A pyrophoric lighter comprising a body having a chamber to contain inflammable spirit, a cup shaped striking steel carried by the body and having a wick receiving passage communicating with said chamber and having a peripheral edge extending above the wick and forming a shield for the flame thereof and provided with opposite slots forming air passages for currents of air drawn into the lighter when the same is lighted and held in substantially horizontal position, whereby the flame of the lighter is increased in size and strength, said slots also being arranged so that the flame may be drawn through them for pipe lighting, an enclosing cap for the steel, and a flint mounted on said cap.

2. A pyrophoric lighter comprising a body having a chamber to contain inflammable spirit, a cup shaped striking steel carried by the body and having a wick receiving passage communicating with said chamber and having a peripheral edge extending above the wick and forming a shield for the flame thereof and provided with opposite slots forming air passages for currents of air drawn into the lighter when the same is lighted and held in substantially horizontal position, whereby the flame of the lighter is increased in size and strength, said slots also being arranged so that the flame may be drawn through them for pipe lighting, and interchangeable caps for the ends of the body, each cap being provided with a flint.

BÉLA SÁNDOR.